(12) United States Patent
Horiguchi et al.

(10) Patent No.: US 8,681,396 B2
(45) Date of Patent: Mar. 25, 2014

(54) IMAGE SENSOR UNIT AND IMAGE READING APPARATUS USING THE SAME

(75) Inventors: Tomoyuki Horiguchi, Saitama (JP);
Hidemasa Yoshida, Saitama (JP);
Akifumi Fujiwara, Saitama (JP);
Hidehisa Takahashi, Saitama (JP)

(73) Assignee: Canon Components, Inc. (JP)

( * ) Notice: Subject to any disclaimer, the term of this patent is extended or adjusted under 35 U.S.C. 154(b) by 0 days.

(21) Appl. No.: 13/570,531

(22) Filed: Aug. 9, 2012

(65) Prior Publication Data
US 2013/0038912 A1  Feb. 14, 2013

(30) Foreign Application Priority Data

Aug. 9, 2011  (JP) .................................. 2011-174386
Jul. 6, 2012  (JP) .................................. 2012-152286

(51) Int. Cl.
*H04N 1/04* (2006.01)

(52) U.S. Cl.
USPC ............ 358/474; 358/475; 358/509; 358/497

(58) Field of Classification Search
USPC .......... 358/474, 497, 496, 482, 483, 475, 509
See application file for complete search history.

(56) References Cited

U.S. PATENT DOCUMENTS

| | | | |
|---|---|---|---|
| 5,119,232 A | 6/1992 | Daley et al. | |
| 5,673,122 A | 9/1997 | Omori | |
| 5,864,408 A | 1/1999 | Kumashiro | |
| 7,042,598 B2 | 5/2006 | Payne | |
| 7,274,495 B2 * | 9/2007 | Tseng | ........................... 358/484 |
| 7,284,891 B2 | 10/2007 | Saito et al. | |
| 7,722,223 B2 | 5/2010 | Saito et al. | |
| 7,751,098 B2 * | 7/2010 | Tseng | ........................... 358/484 |
| 7,859,726 B2 | 12/2010 | Endo et al. | |

(Continued)

FOREIGN PATENT DOCUMENTS

| | | |
|---|---|---|
| EP | 0 252 709 A2 | 1/1988 |
| EP | 0 557 891 A1 | 9/1993 |

(Continued)

OTHER PUBLICATIONS

Extended European Search Report for EP 11194502.8, mail date Dec. 4, 2012. Cited related co-pending U.S. Appl. No. 13/328,553.

(Continued)

*Primary Examiner* — Negussie Worku
(74) *Attorney, Agent, or Firm* — Rossi, Kimms & McDowell LLP (57) ABSTRACT

An image sensor unit includes a reflection reading light source that illuminates a bill, a substrate on which the reflection reading light source is mounted, a reflection reading light guide that guides the light emitted by the reflection reading light source to the bill, a rod-lens array that focuses the light from the bill, a light receiving element that receives the light from the rod-lens array, a sensor substrate on which the light receiving element is mounted, and a frame that houses the substrate, the reflection reading light guide, the rod-lens array and the sensor substrate. The sensor substrate has a passage hole and is disposed closer to the bill than the substrate. The frame is disposed with the reflection reading light guide inserted into the passage hole, so that the light from the reflection reading light source reaches the bill through the passage hole.

7 Claims, 6 Drawing Sheets

(56) References Cited

U.S. PATENT DOCUMENTS

| | | | |
|---|---|---|---|
| 8,059,315 B2 * | 11/2011 | Endo et al. | 358/474 |
| 8,218,205 B2 * | 7/2012 | Nagatani et al. | 358/475 |
| 8,264,754 B2 * | 9/2012 | Harada | 358/498 |
| 8,358,447 B2 * | 1/2013 | Kim et al. | 358/474 |
| 8,422,917 B2 * | 4/2013 | Shinkawa | 399/200 |
| 8,482,819 B2 * | 7/2013 | Schmidt et al. | 358/475 |
| 8,488,216 B2 * | 7/2013 | Sakamoto et al. | 358/475 |
| 8,493,637 B2 * | 7/2013 | Takeda | 358/474 |
| 8,520,271 B2 * | 8/2013 | Nishio | 358/475 |
| 2006/0152942 A1 | 7/2006 | Saito et al. | |
| 2007/0285740 A1 | 12/2007 | Onishi et al. | |
| 2008/0068682 A1 | 3/2008 | Morikawa | |
| 2008/0112017 A1 | 5/2008 | Nagasaka | |
| 2009/0003000 A1 | 1/2009 | Saito et al. | |
| 2009/0027743 A1 | 1/2009 | Hun | |
| 2009/0294630 A1 | 12/2009 | Saito et al. | |
| 2009/0310193 A1 | 12/2009 | Endo et al. | |
| 2012/0154876 A1 | 6/2012 | Shimoda | |
| 2012/0154877 A1 | 6/2012 | Kisara et al. | |
| 2012/0162727 A1 | 6/2012 | Shimoda et al. | |
| 2012/0287484 A1 | 11/2012 | Shimoda et al. | |
| 2013/0009037 A1 | 1/2013 | Takahashi | |
| 2013/0038912 A1 | 2/2013 | Horiguchi et al. | |
| 2013/0038913 A1 | 2/2013 | Shimoda et al. | |
| 2013/0038914 A1 | 2/2013 | Yoshida et al. | |

FOREIGN PATENT DOCUMENTS

| | | |
|---|---|---|
| EP | 0 844 784 A2 | 11/1997 |
| EP | 1 049 055 A2 | 4/2000 |
| EP | 1 471 472 A2 | 4/2004 |
| EP | 1 835 469 A2 | 9/2007 |
| EP | 2 246 825 A1 | 4/2009 |
| EP | 2 134 071 A2 | 12/2009 |
| FR | 2 655 799 A1 | 6/1991 |
| JP | 8-223417 A | 8/1996 |
| JP | 09-214675 A | 8/1997 |
| JP | 10-285330 A | 10/1998 |
| JP | 2001-005122 A | 1/2001 |
| JP | 2003-037717 A | 2/2003 |
| JP | 2003-046726 A | 2/2003 |
| JP | 2003-281913 A | 10/2003 |
| JP | 2004-146870 A | 5/2004 |
| JP | 2005-223424 A | 8/2005 |
| JP | 2006-311232 A | 11/2006 |
| JP | 3885088 B2 | 11/2006 |
| JP | 2007-116590 A | 5/2007 |
| JP | 2007-194797 A | 8/2007 |
| JP | 2007-300536 A | 11/2007 |
| JP | 2008-42425 A | 2/2008 |
| JP | 2008-112301 A | 5/2008 |
| JP | 2009-086488 A | 4/2009 |
| JP | 2009301200 A | 12/2009 |
| JP | 2010-136061 A | 6/2010 |
| JP | 2011-124741 A | 6/2011 |
| WO | 2006/137263 A1 | 12/2006 |
| WO | 2007/077760 A1 | 7/2007 |
| WO | 2008/013234 A1 | 1/2008 |

OTHER PUBLICATIONS

Japanese Office Action for JP 2011-236415, mail date Nov. 13, 2012. Cited related co-pending U.S. Appl. No. 13/328,553.
Japanese Office Action for JP 2010-282128, dated Nov. 6, 2012.Cited in related co-pending U.S. Appl. No. 13/328,553.
International Search Report for PCT/JP2010/069500, mail date Nov. 30, 2010. Cited in related co-pending U.S. Appl. No. 13/328,553.
Japanese Office Action for JP 2012-247653, mail date Dec. 11, 2012. Cited in related co-pending U.S. Appl. No. 13/328,553.
Extended European search report issued in corresponding European Patent Application No. 12179608.0 dated Nov. 21, 2012. Cited related co-pending U.S. Appl. No. 13/570,645.
Korean Office Action dated Sep. 13, 2013, issued in Corresponding Korean Application No. 10-2012-86955.

* cited by examiner

IMAGE SENSOR UNIT AND IMAGE READING APPARATUS USING THE SAME

CROSS-REFERENCE TO RELATED APPLICATIONS

This application is based upon and claims the benefit of priority of the prior Japanese Patent Application No. 2011-174386, filed on Aug. 9, 2011, and the Japanese Patent Application No. 2012-152286, filed on Jul. 6, 2012, the entire contents of which are incorporated herein by reference.

BACKGROUND OF THE INVENTION

1. Field of the Invention

The present invention relates to an image sensor unit used in an image reading apparatus, such as a copying machine, image scanner, facsimile and so on, and the image reading apparatus using the image sensor unit. In particular, the present invention relates to a paper sheet identification apparatus that authenticates a recording medium, such as a bill, security and so on.

2. Description of the Related Art

Well-known image reading apparatuses include a copying machine, image scanner, facsimile, paper sheet identification apparatus that authenticates a recording medium, such as a bill, security and so on. In such an image reading apparatus, a contact image sensor (CIS) unit that optically reads image information on an illuminated object and converts the information into electric signals is used. Patent Document 1 and Patent Document 2 disclose such a contact image sensor.

The contact image sensor unit is required to illuminates the object to be illuminated with a uniform illuminance at the reading position (along the reading line). For example, if an array of LEDs arranged at predetermined intervals in the main scan direction is used, such as in Patent Document 1 described above, the parts where the LEDs are arranged and the parts where the LEDS are not arranged can illuminate the object with difference illuminances. Thus, there is a problem that an illuminance unevenness occurs at the reading position for the illuminated object, and the image reading quality deteriorates.

To solve the problem, as with the image sensor disclosed in Patent Document 2, the illuminance at the reading position can be made uniform by increasing the optical path length from the LEDs to the reading position for the illuminated object, thereby diffusing the light from each LED. However, with the image sensor disclosed in Patent Document 2, the sensor substrate on which the sensor IC (light receiving element) is mounted that is disposed above the LED substrate on which the LED chip is mounted is disposed close to the light guide, so that the size of the sensor substrate has to be small. As a result, it can be difficult to mount a chip or the like other than the sensor IC on the sensor substrate. As a result, there is a problem that the sensor substrate needs to be connected, using a connector or the like, to another substrate on which the chip or the like other than the sensor IC is mounted, and the number of components increases.

Patent Document 1: Japanese Laid-open Patent Publication No. 2011-124741

Patent Document 2: Japanese Laid-open Patent Publication No. 2007-116590

SUMMARY OF THE INVENTION

The present invention has been made in view of the problems described above, and an object of the present invention is to provide an image sensor unit and an image reading apparatus that can reduce illuminance unevenness without increasing the number of components.

An image sensor unit according to the present invention is an image sensor unit that reads image information from an illuminated object, comprising: a light source that illuminates an object to be illuminated; a first substrate on which the light source is mounted; a light guide that guides light emitted by the light source to the object to be illuminated; an imaging element that focuses light from the illuminated object; a light receiving element that receives light from the imaging element; a second substrate on which the light receiving element is mounted; and a frame that houses the first substrate, the light guide, the imaging element and the second substrate, wherein the second substrate has a passage hole and is disposed closer to the object to be illuminated than the first substrate, and the frame is disposed with the light guide inserted into the passage hole, so that the light from the light source reaches the object to be illuminated through the passage hole.

An image reading apparatus according to the present invention is an image reading apparatus provided with an image sensor unit that image information from an illuminated object, comprising: a light source that illuminates an object to be illuminated; a first substrate on which the light source is mounted; a light guide that guides light emitted by the light source to the object to be illuminated; an imaging element that focuses light from the illuminated object; a light receiving element that receives light from the imaging element; a second substrate on which the light receiving element is mounted; and a frame that houses the first substrate, the light guide, the imaging element and the second substrate, wherein the second substrate has a passage hole and is disposed closer to the object to be illuminated than the first substrate, the frame is disposed with the light guide inserted into the passage hole, so that the light from the light source reaches the object to be illuminated through the passage hole, and the image sensor unit reads the image information from the illuminated object while the illuminated object and the image sensor unit are moved with respect to each other.

An image reading apparatus according to the present invention is an image reading apparatus provided with a first image sensor unit and a second image sensor unit that read image information from an illuminated object, the first image sensor unit and the second image sensor unit being disposed one above the other, wherein the first image sensor unit comprises: a reflection reading light source that illuminates an object to be illuminated; a transmission reading light source that illuminates the object to be illuminated; a first substrate on which the reflection reading light source is mounted; a reflection reading light guide that guides light emitted by the reflection reading light source to the object to be illuminated; a transmission reading light guide that guides light emitted by the transmission reading light source to the object to be illuminated; an imaging element that focuses light from the illuminated light; a light receiving element that receives light from the imaging element; a second substrate on which the transmission reading light source and the light receiving element are mounted; and a frame that houses the first substrate, the reflection reading light guide, the transmission reading light guide, the imaging element and the second substrate, the second substrate has a passage hole and is disposed closer to the object to be illuminated than the first substrate, the frame is disposed with the reflection reading light guide inserted into the passage hole, so that the light from the reflection reading light source reaches the object to be illuminated through the reflection reading light guide in passage hole, the light from the transmission reading light source reaches the object to be illuminated through the transmission reading light guide, the second image sensor unit comprises: an imaging element that focuses light from the illuminated object; a light receiving element that receives light from the imaging element; a sensor substrate on which the light receiving element is mounted; and a frame that houses the imaging element and the sensor substrate, and the first image sensor unit emits light to one surface of the object to be illuminated and reads the image information using light reflected by the object, and the second image sensor unit reads the image information using light transmitted through the object.

DETAILED DESCRIPTION OF THE PREFERRED EMBODIMENTS

In the following, image sensor units and image reading apparatuses according to preferred embodiments of the present invention will be described with reference to the drawings.

First Embodiment

An image reading apparatus 100 according to a first embodiment functions as a paper sheet discriminating apparatus that authenticates a recording medium, such as a bill, security and so on.

Figure 1:
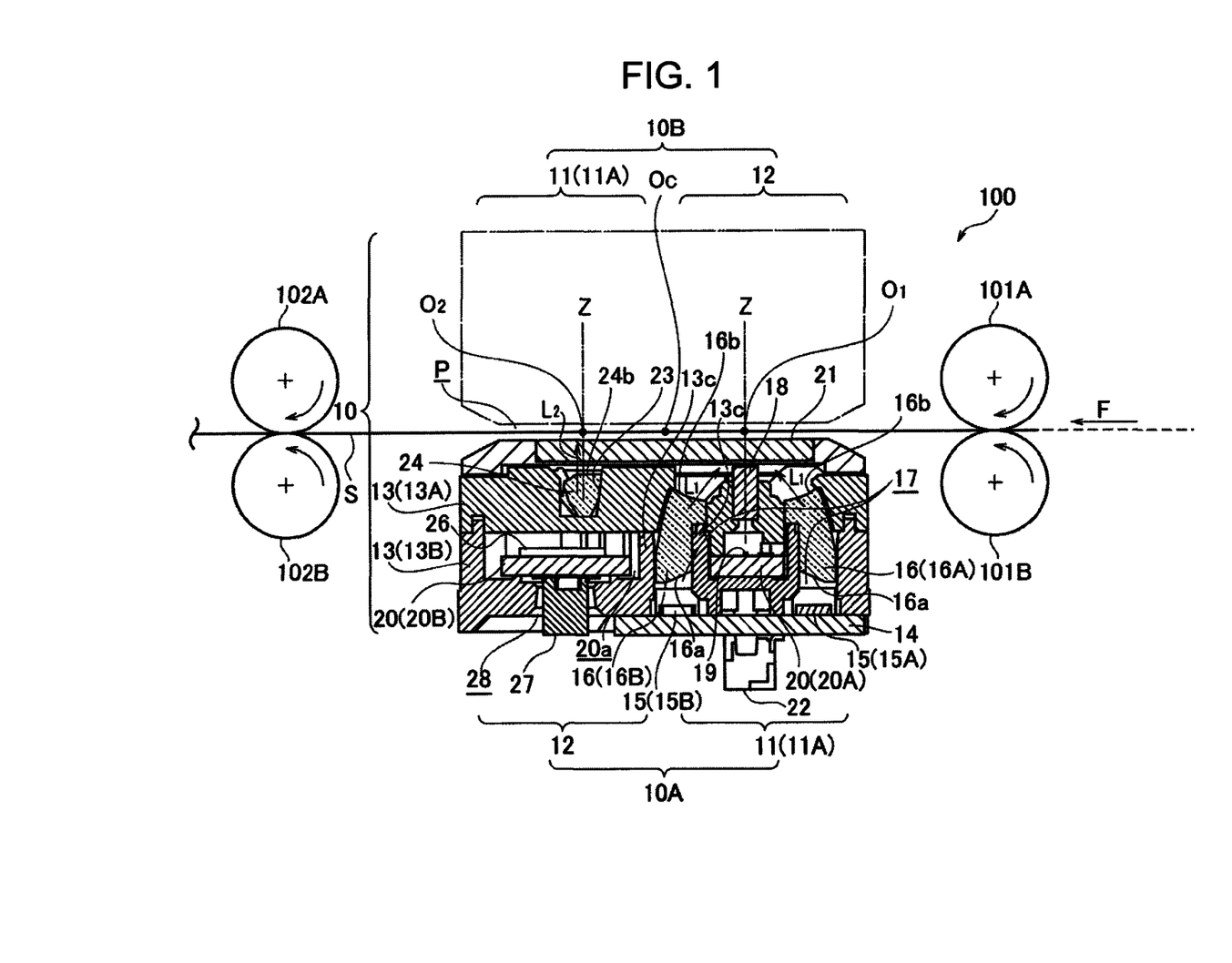
FIG. 1 is a sectional view illustrating a configuration of essential parts of an image reading apparatus 100 provided with an image sensor unit 10 according to a first embodiment.

FIG. 1 illustrates a configuration of essential parts of the image reading apparatus 100 provided with an image sensor unit 10 according to this embodiment. First, the entire configuration will be schematically described. In this embodiment, a bill S will be described as a typical example of an illuminated object. However, the present invention can also be applied to other objects than the bill S.

In the image reading apparatus 100, a pair of conveyor rollers 101A and 101B and a pair of conveyor rollers 102A and 102B for conveying the bill S held therebetween are disposed at predetermined positions at a predetermined distance in a conveyance direction F of the bill S. The conveyor rollers 101A, 101B, 102A and 102B are designed to be rotated by a driving mechanism to convey the bill S to the image sensor unit 10 at a predetermined conveyance speed in the conveyance direction F, causing the bill S and the image sensor unit 10 to move with respect to each other.

The image sensor unit 10 is disposed between the pair of conveyor rollers 101A and 101B and the pair of conveyor rollers 102A and 102B to provide a gap that forms a conveyance path P through which the bill S can pass (the width of the conveyance path P=2.0 mm in this embodiment) and reads an image of the bill S conveyed. The image sensor unit 10 has a lower image sensor unit portion 10A that serves as a first image sensor unit located below the conveyance path P for the bill S and an upper image sensor unit portion 10B that serves as a second image sensor unit located above the conveyance path P for the bill S. In this embodiment, the lower image sensor unit portion 10A and the upper image sensor unit portion 10B have the same configuration and disposed symmetrically with respect to a center line Oc shown in FIG. 1. Each of the lower image sensor unit portion 10A and the upper image sensor unit portion 10B has an image reading portion 11 for reading an image that includes a reflection reading illumination portion 11A that emits light for reflection reading to the bill S and a transmission reading illumination portion 12 that emits light for transmission reading to the bill S. The image reading portion 11 (reflection reading illumination portion 11A) and the transmission reading illumination portion 12 allow reading of image information on the bill S using both the reflected light and the transmitted light. The transmission reading illumination portion 12 of the upper image sensor unit portion 10B is disposed in a position corresponding to the image reading portion 11 of the lower image sensor unit portion 10A. The image reading portion 11 of the upper image sensor unit portion 10B is disposed in a position corresponding to the transmission reading illumination portion 12 of the lower image sensor unit portion 10A. Thus, in this embodiment, the lower image sensor unit portion 10A and the upper image sensor unit portion 10B can read the both surfaces of the bill S in one conveyance.

Figure 2A:
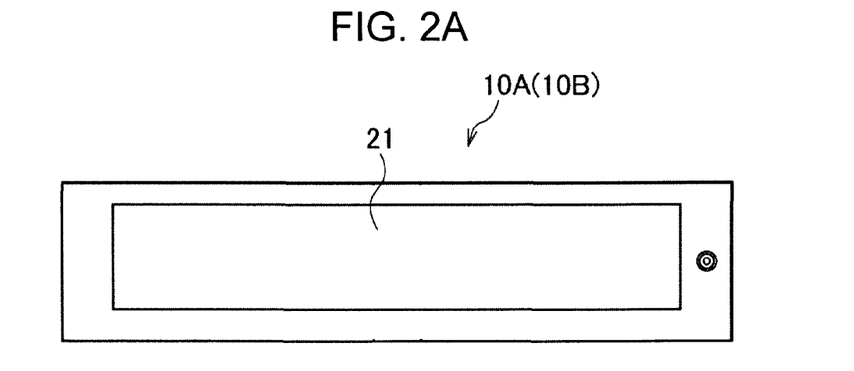
FIG. 2A is a top view illustrating an appearance of the image sensor unit 10 according to the first embodiment.
Figure 2B:
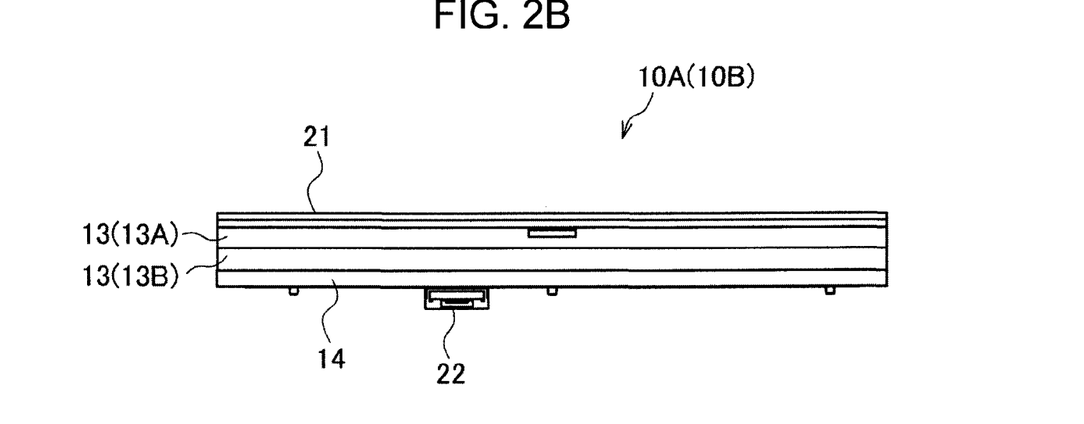
FIG. 2B is a front view illustrating an appearance of the image sensor unit 10 according to the first embodiment.
Figure 2C:
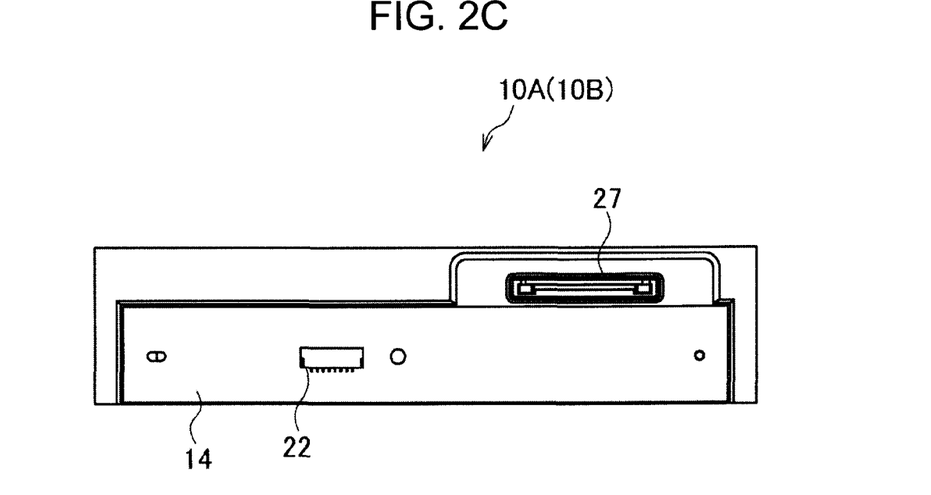
FIG. 2C is a bottom view illustrating an appearance of the image sensor unit 10 according to the first embodiment.

Of the lower image sensor unit portion 10A and the upper image sensor unit portion 10B, the lower image sensor unit portion 10A will be particularly described below. FIG. 2A, FIG. 2B and FIG. 2c are diagrams illustrating appearances of the lower image sensor unit portion 10A. FIG. 2A is a top view, FIG. 2B is a front view, and FIG. 2C is a bottom view. The lower image sensor unit portion 10A has a generally rectangular shape, the longitudinal direction being aligned with the main-scan direction, and the sub-scan direction perpendicular to the main-scan direction being aligned with the conveyance direction F for the bill S.

A numeral 13 denotes a frame that is a member forming a housing, and the frame 13 can be divided into two parts: an upper frame 13A and a lower frame 13B.

A numeral 14 denotes a substrate (first substrate) disposed on the bottom of the lower frame 13B, on which a reflection reading light source 15 comprising a plurality of light emitting elements arranged in the main-scan direction is mounted. The light emitting elements of the reflection reading light source 15 are LEDs that emit light of wavelengths of red light, green light, blue light, infrared light and ultraviolet light (abbreviated as RGB, IR and UV hereinafter), for example.

A numeral 16 denotes a reflection reading light guide for guiding light emitted by the reflection reading light source 15 to a reading position (reading line) $O_1$ on one surface (lower surface) of the bill S, and the reflection reading light guide 16 is elongated in the main-scan direction. The reflection reading light guide 16 is made of a transparent material, such as an acrylic resin and polycarbonate. The reflection reading light guide 16 has a bottom surface that serves as an incident surface 16a on which the light from the reflection reading light source 15 is incident and a top surface that serves as a reflected light emission surface 16b from which the light having propagated through the interior of the reflection reading light guide 16 is emitted. The reflected light emission surface 16b has a concave shape facing the bill S so as to have a diffusion effect, for example. The reflection reading light guide 16 is attached to the frame 13 with the reflected light emission surface 16b being directed toward the bill S. The other surfaces of the reflection reading light guide 16 than the incident surface 16a and the reflected light emission surface 16b are substantially formed to be reflection surfaces. A numeral 17 denotes a reflection reading light guide housing portion having an opening formed to extend from the bottom surface of the frame 13 in substantially the vertical direction, which is configured to be capable of housing the reflection reading light guide 16 above the reflection reading light source 15.

A numeral 18 denotes a rod-lens array that serves as an imaging element, which comprises a plurality of rod-lenses of an erect equal magnification imaging type linearly arranged in the main-scan direction, for example. A numeral 19 denotes a light receiving element provided with a photoelectric conversion element that converts light into an electric signal. A numeral 20 denotes a sensor substrate (second substrate) on which the light receiving element 19 is mounted. The sensor substrate 20 has a planar shape whose longitudinal direction is aligned with the main-scan direction and is fixed to the upper frame 13A by caulking, for example. On the sensor substrate 20, a plurality of (six in FIG. 4) light receiving elements 19 are arranged in the main-scan direction so as to be substantially aligned with an optical axis Z of the rod-lens array 18, so that the reflected light (or transmitted light) from the bill S is focused on the light receiving elements 19. The sensor substrate 20 has a passage hole 20a described later into which the reflection reading light guide 16 is inserted. The top of the upper frame 13A is covered with a transparent cover glass 21. The imaging element is not limited to the rod-lens array 18 but may be a micro-lens array, for example.

With such a configuration, the substrate 14 on which the reflection reading light source 15 is mounted is disposed on the bottom of the lower frame 13B, so that the optical path length to a reading position $O_1$ for the bill S can be increased. As a result, the light from each LED is diffused, the illuminance at the reading position $O_1$ is made uniform, and thus the illuminance unevenness can be reduced. In addition, since the substrate 14 is formed as a part of the bottom surface of the image sensor unit 10, the heat radiation of the substrate 14 is improved. If the substrate 14 is made of a material having high heat conductivity, such as an aluminum alloy, the heat radiation can be further improved. In addition, a first connector 22 for receiving an instruction from the image reading apparatus 100 is attached to the lower surface of the substrate 14 and protrudes under the lower frame 13B.

Figure 3:
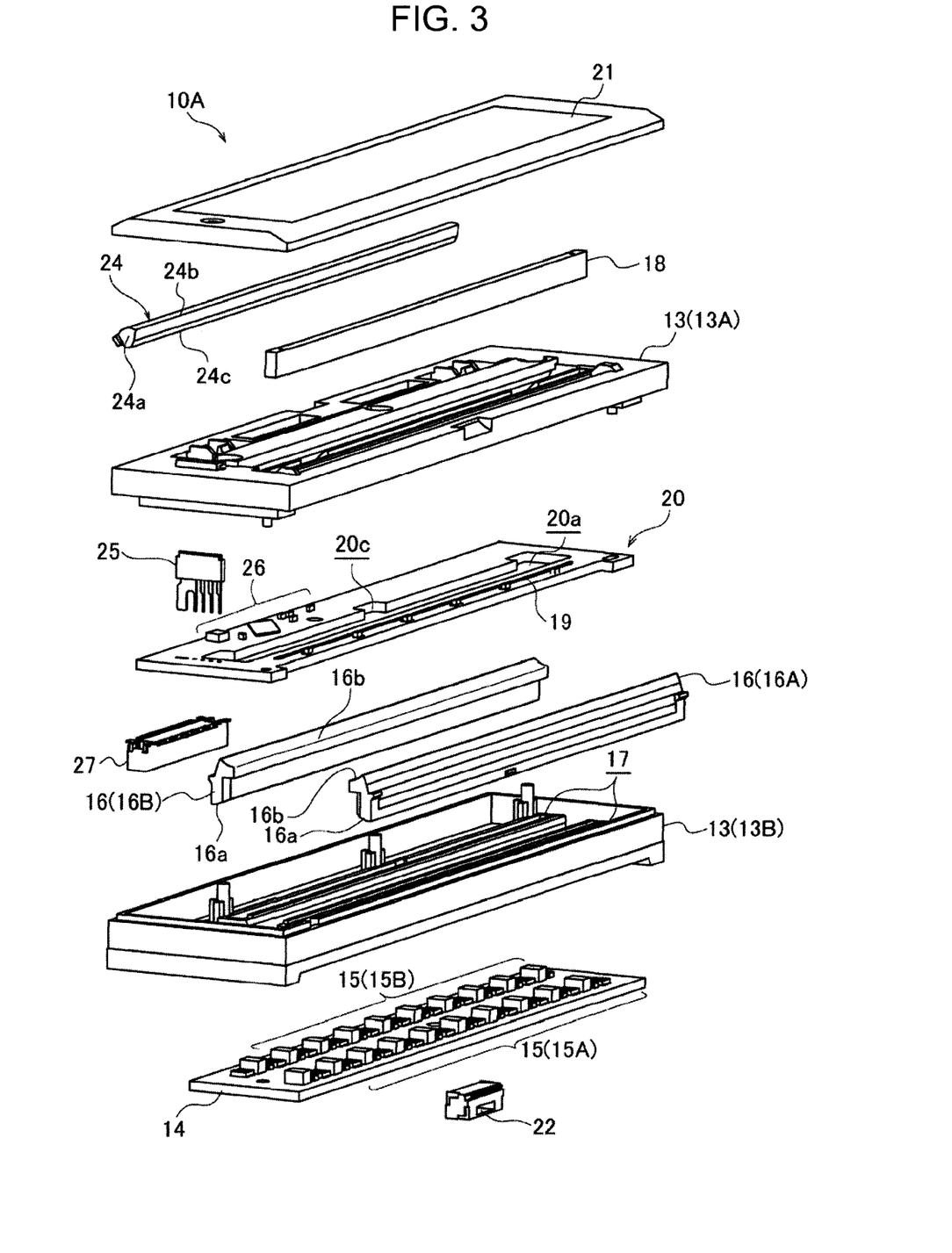
FIG. 3 is a schematic exploded view of the image sensor unit 10 according to the first embodiment.

As shown in FIG. 3, each of the reflection reading light guide 16, the rod-lens array 18, the sensor substrate 20 and other members is fitted into the frame 13 and positioned therein. In this embodiment, the reflection reading illumination portion 11A is configured so that the pair of the reflection reading light source 15 (a reflection reading light source 15A serving as a first light source, a reflection reading light source 15B serving as a second light source) and the reflection reading light guide 16 (a reflection reading light guide 16A serving as a first light guide, a reflection reading light guide 16B serving as a second light guide) are disposed on the opposite sides of the optical axis Z of the rod-lens array 18. In particular, the reflection reading light guide 16A and the reflection reading light guide 16B are disposed to face each other with the light receiving element 19 interposed therebetween. The image reading portion 11 includes the reflection reading illumination portion 11A.

A basic operation of the image reading portion 11 configured as described above will be described. The image reading portion 11 successively activates the RGB, IR and UV light emitting elements of the reflection reading light sources 15A and 15B to make them emit light to the bill S conveyed by the conveyor rollers 101A, 101B, 102A and 102B in the conveyance direction F at a predetermined conveyance speed. The light emitted by the reflection reading light sources 15A and 15B enters the reflection reading light guides 16A and 16B through the respective incident surfaces 16a. The incident light propagates through the reflection reading light guides 16A and 16B by being reflected in the reflection reading light guides 16A and 16B, in detail, by total reflections on the reflection surfaces thereof, and is emitted from the respective reflected light emission surfaces 16b as representatively shown by the arrow $L_1$ toward the reading position $O_1$ for the bill S. With a line of light in the main-scan direction formed by the emitted light from the two directions on the opposite sides of the rod-lens array 18, one surface (lower surface) of the bill S is uniformly illuminated.

The illumination light is reflected by the bill S and then focused through the rod-lens array 18 to form an image on the light receiving element 19. The reflected light focused to form an image is converted into an electric signal by the light receiving element 19, and the electric signal is processed by a signal processing portion.

The operation of reading the bill S along one scan line in the main-scan direction is completed by reading all of the RGB, IR and UV reflected light for one scan line as described above. When the reading operation for one scan line is completed, the bill S is moved in the sub-scan line direction, and the same reading operation as described above is performed for the next one scan line. The reading operation for one scan line is repeated while conveying the bill S in the conveyance direction F, thereby sequentially scanning the whole surface of the bill S to achieve reading of the image information with the reflected light.

The image reading portion 11 of the upper image sensor unit portion 10B performs the same operation on the other surface (upper surface).

A numeral 23 denotes a transmission reading light guide housing portion having an opening formed in the upper frame 13A. A numeral 24 denotes a transmission reading light guide that is elongated in the main-scan direction. The transmission reading light guide 24 is fitted into the transmission reading light guide housing portion 23 and, once positioned, is adjacent to the reflection reading light guide 16 in the sub-scan direction. In this embodiment, a single transmission reading light guide 24 is provided. The transmission reading light guide 24 is made of a transparent material, such as an acrylic resin and polycarbonate, and is elongated in the main-scan direction. A numeral 25 denotes a transmission reading light source disposed in the vicinity of one end face in the longitudinal direction of the transmission reading light guide 24, which is mounted on the sensor substrate 20 at a position closer to one end of the sensor substrate 20 in the main-scan direction. The transmission reading light source 25 comprises light emitting elements that are LEDs that emit light of wavelengths of red light, green light, blue light, infrared light and ultraviolet light (abbreviated as RGB, IR and UV hereinafter), for example.

The transmission reading light guide 24 has one end face in the longitudinal direction that serves as an incident surface 24a on which the light from the transmission reading light source 25 is incident, a top surface that serves as a transmitted light emission surface 24b from which the light having propagated through the transmission reading light guide 24 is emitted, and a surface opposite to the transmitted light emission surface 24b that serves as a diffusing surface 24c (see FIG. 3). The transmitted light emission surface 24b has a convex shape facing the bill S so as to have a light collecting effect. The transmission reading light guide 24 is attached to the upper frame 13A with the transmitted light emission surface 24b being directed toward the bill S. In the diffusing surface 24c, a light diffusing pattern is formed of a light reflective paint by silk screen printing, for example. The other surfaces than the incident surface 24a, the transmitted light emission surface 24b and the diffusing surface 24c are substantially formed as reflection surfaces.

The transmission reading illumination portion 12 includes the transmission reading light source 25 and the transmission reading light guide 24 in this embodiment.

With the transmission reading illumination portion 12 provided in the lower image sensor unit portion 10A, the light transmitted through the bill S is received by the light receiving element 19 through the rod-lens array 18 of the upper image sensor unit portion 10B. The rod-lens array 18 and the light receiving element 19 are the same as the rod-lens array 18 and the light receiving element 19 of the lower image sensor unit portion 10A.

With the transmission reading illumination portion 12 provided in the upper image sensor unit portion 10B, the light transmitted through the bill S is received by the light receiving element 19 through the rod-lens array 18 of the lower image sensor unit portion 10A.

An operation of the transmission reading illumination portion 12 configured as described above will be described. The transmission reading illumination portion 12 successively activates the RGB, IR and UV light emitting elements of the transmission reading light source 25 to make the transmission reading light source 25 emit light to the bill S conveyed by the conveyor rollers 101A, 101B, 102A and 102B in the conveyance direction F at a predetermined conveyance speed. The light emitted by the transmission reading light source 25 enters the transmission reading light guide 24 through the incident surface 24a. The incident light propagates through the transmission reading light guide 24 by being reflected and diffused in the transmission reading light guide 24 according to the light diffusing pattern formed in the diffusing surface 24c and by total reflections on the reflection surfaces thereof, and is emitted from the transmitted light emission surface 24b as representatively shown by the arrow $L_2$ toward the reading position $O_2$ for the bill S. With a line of light in the main-scan direction formed by the emitted light, one surface (lower surface) of the bill S is uniformly illuminated.

The illumination light is transmitted through the bill S and then focused through the rod-lens array 18 to form an image on the light receiving element 19. The transmitted light focused to form an image is converted into an electric signal by the light receiving element 19, and the electric signal is processed by a signal processing portion.

The operation of reading the bill S along one scan line in the main-scan direction is completed by reading all of the RGB, IR and UV transmitted light for one scan line as described above. When the reading operation for one scan line is completed, the bill S is moved in the sub-scan line direction, and the same reading operation as described above is performed for the next one scan line. The reading operation for one scan line is repeated while conveying the bill S in the conveyance direction F, thereby sequentially scanning the whole surface of the bill S to achieve reading of the image information with the transmitted light.

The transmission reading illumination portion 12 of the upper image sensor unit portion 10B performs the same operation on the other surface (upper surface).

Figure 4:
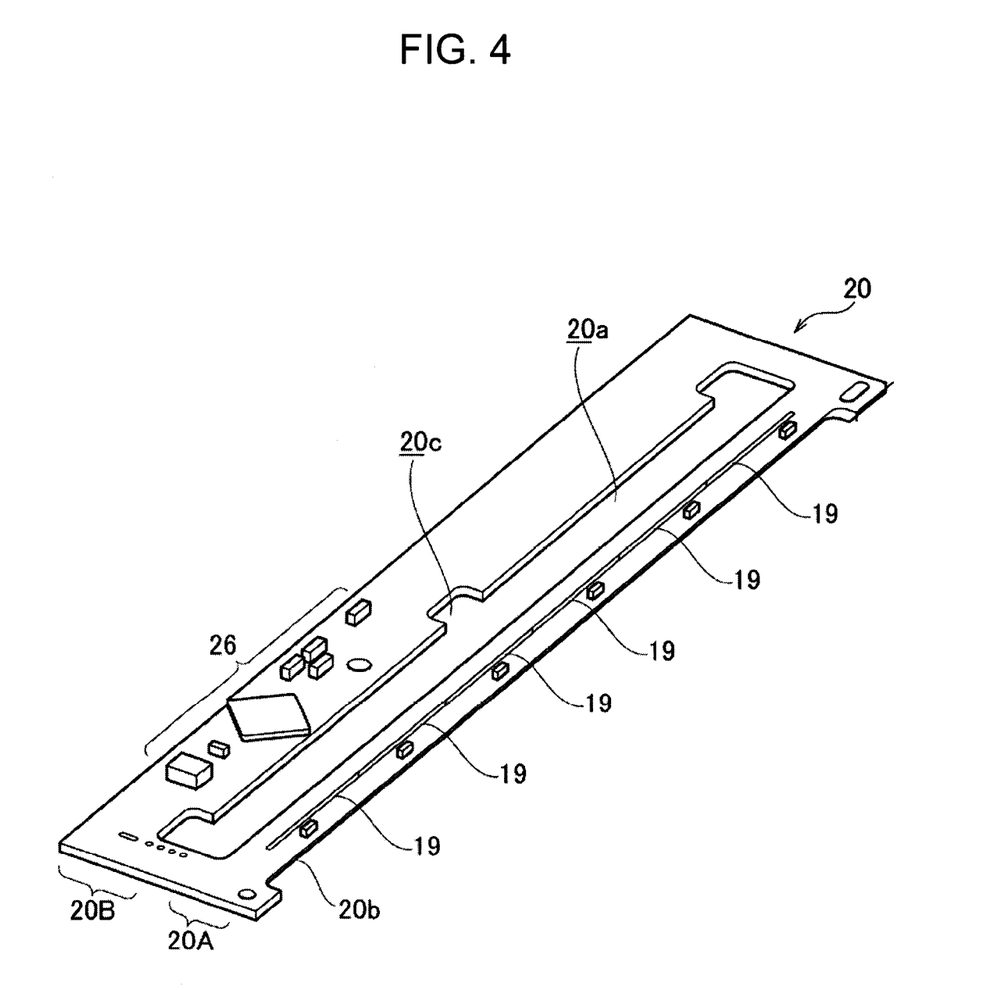
FIG. 4 is a perspective view illustrating an appearance of a sensor substrate 20.

FIG. 4 is a perspective view illustrating an appearance of the sensor substrate 20.

The sensor substrate 20 has the passage hole 20a that allows the light emitted by the reflection reading light source 15B to pass through the sensor substrate 20. The passage hole 20a is elongated in the main-scan direction so as to comply with the shape of the reflection reading light guide 16B.

In this embodiment, as shown in FIG. 1, the frame 13 has the reflection reading light guide housing portions 17 formed both in the upper frame 13A and the lower frame 13B on the opposite sides of the optical axis Z of the rod-lens array 18, and the upper frame 13A and the lower frame 13B combined with each other hold the reflection reading light guides 16A and 16B spaced apart from each other in the sub-scan direction.

The reflection reading light guide 16B is positioned in the passage hole 20a by being held by a holding portion 13c inserted into the passage hole 20a with a part closer to the reflected light emission surface 16b abutting against the upper frame 13A.

With such a configuration, since the sensor substrate 20 is disposed with the reflection reading light guide 16B being inserted into the passage hole 20a, the light emitted by the reflection reading light source 15B passes through the sensor substrate 20 through the reflection reading light guide 16B inserted into the passage hole 20a. Therefore, the light emitted by the reflection reading light source 15B reaches the reading position $O_1$ for the bill S through the reflection reading light guide 16B disposed in the passage hole 20a.

On the other hand, the reflection reading light guide 16A is disposed along a side edge 20b (right edge in FIG. 4) of the sensor substrate 20. Therefore, the light emitted by the reflection reading light source 15A reaches the reading position $O_1$ for the bill S through the reflection reading light guide 16A disposed along the side edge 20b of the sensor substrate 20.

On the sensor substrate 20, the light receiving element 19 is mounted in a sensor portion 20A of one side in the sub-scan direction from the passage hole 20a, an a control chip or the like including a driving circuit 26 for driving the transmission reading light source 25 and the light receiving element 19 (including a photoelectric conversion element) is mounted in a driving portion 20B of the other side in the sub-scan direction from the passage hole 20a.

Since the transmission reading light source 25 is mounted on the sensor substrate 20, the transmission reading light source 25 is disposed in the vicinity of the incident surface 24a of the transmission reading light guide 24 when the transmission reading light guide 24 is housed in the transmission reading light guide housing portion 23. The light emitted by the transmission reading light source 25 reaches the reading position $O_2$ for the bill S through the transmission reading light guide 24.

A plurality of notches 20c is formed in the passage hole 20a of the sensor substrate 20. The notches 20c are formed to prevent interference with fitting portions formed on one of the upper frame 13A and the lower frame 13B to face the other for assembly of the upper frame 13A and the lower frame 13B. A second connector 27 for receiving an instruction from the image reading apparatus 100 is attached to the lower surface of the sensor substrate 20 and protrudes under the lower frame 13B through a through-hole 28 formed in the lower frame 13B as shown in FIG. 1.

Since the sensor substrate 20 also has a certain dimension in the sub-scan direction, the substrate 14 and the sensor substrate 20 partially overlaps with each other in the direction of the optical axis Z.

As described above, in the image sensor unit 10 according to this embodiment, the substrate 14 on which the reflection reading light sources 15 (the reflection reading light source 15A and the reflection reading light source 15B) are mounted is disposed on the bottom of the lower frame 13B, so that the optical path length from the reflection reading light sources 15 to the reading position $O_1$ can be increased. Therefore, the light emitted by each LED serving as the reflection reading light sources 15 is diffused in the reflection reading light guides 16 (the reflection reading light guide 16A and the reflection reading light guide 16B) when the light reaches the reading position $O_1$ for the bill S, so that the illuminance at the reading position $O_1$ can be made uniform, and the illuminance unevenness can be reduced.

Further, the sensor substrate 20 on which the light receiving element 19 is mounted is disposed above the substrate 14 on which the reflection reading light source 15 is mounted, and the sensor substrate 20 has the passage hole 20a that allows the light emitted from the reflection reading light guides 16 to pass through the sensor substrate 20. Therefore, the sensor substrate 20 can have an increased size, and the control chip or the like including the driving circuit 26 and so on can be mounted on the sensor substrate 20. That is, since the control chip or the like that cannot be mounted in the sensor portion 20A can be mounted in the driving portion 20B, neither additional substrates nor connectors are needed, and thus, the number of components can be reduced. In addition, since the light receiving element 19 can be disposed spaced apart from the control chip or the like including the driving circuit 26 and so on, transfer of the heat generated by the control chip or the like including the driving circuit 26 and so on to the light receiving element can be prevented. In this way, thermal influence on the light receiving element 19 can be reduced.

Further, since the transmission reading light source 25 is disposed on the sensor substrate 20 that is fixed to the upper frame 13A, the transmission reading light source 25 is placed close to the reading position $O_2$, so that the light quantity does not attenuate. With the illumination apparatus in which the light from the transmission reading light source 25 is incident on one end face serving as the incident surface 24a and is emitted from the top surface serving as the transmitted light emission surface 24b, such as the transmission reading illumination portion 12, the illuminance cannot be made uniform by increasing the optical path length from the transmission reading light source 25 to the reading position $O_2$ for the bill S. Thus, the reading quality is improved by placing the transmission reading light source 25 close to the reading position $O_2$, thereby preventing attenuation of the light quantity.

Further, the first connector 22 and the second connector 27 for receiving an instruction from the image reading apparatus 100 are attached to the substrate 14 and the sensor substrate 20, respectively, and protrude from the lower frame 13B. Since the substrate 14 and the sensor substrate 20 can directly receive the instructions from the image reading apparatus 100 via the first connector 22 and the second connector 27, the structure of the image sensor unit 10 can be simplified.

Second Embodiment

Figure 5:
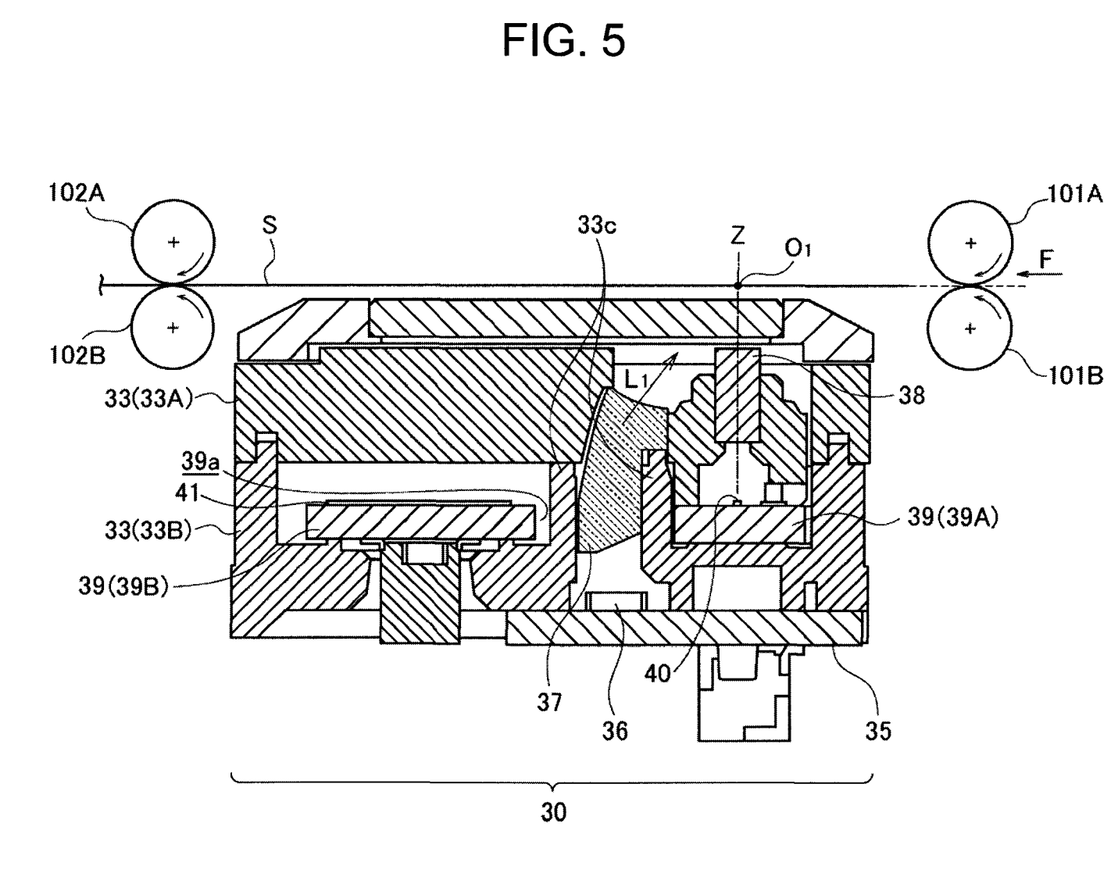
FIG. 5 is a sectional view illustrating a configuration of essential parts of an image sensor unit 30 according to a second embodiment.

A second embodiment consists in an image sensor unit 30 that reads the bill S, for example. FIG. 5 illustrates a configuration of essential parts of the image sensor unit 30 according to this embodiment. The following description will be focused on differences from the first embodiment, and description of parts common to those according to the first embodiment will be omitted as appropriate.

As shown in FIG. 5, this embodiment differs from the first embodiment in that only a single row of reflection reading light sources 36 arranged in the main-scan direction is mounted on a substrate 35 (first substrate) that is fixed to the bottom of a lower frame 33B of a frame 33. Similarly, only a single reflection reading light guide 37 associated with the reflection reading light source 36 is provided. However, this embodiment is the same as the first embodiment in that, on a sensor substrate (second substrate), a light receiving element 40 is mounted in a sensor portion 39A of one side in the sub-scan direction from a passage hole 39a, and a control chip or the like including a driving circuit 41 for driving the light receiving element 40 and so on is mounted in a driving portion 39B of the other side in the sub-scan direction from the passage hole 39a.

With the configuration shown in FIG. 5, the light receiving element 40 mounted on the sensor substrate 39 can be disposed at a position closer to one end of the frame 33 (lower frame 33B) in the sub-scan direction. That is, according to this embodiment, since the light receiving element 40 is disposed at a position that is closer to one end of the frame 33 in the sub-scan direction and is close to a side wall of the frame 33, the image information on the bill S can be read immediately after the bill S is conveyed by the conveyor rollers 101A and 101B.

More specifically, the sensor substrate 39 on which the light receiving element 40 is mounted is fixed to an upper frame 33A by caulking or the like at a position below a rod-lens array 38 and above the substrate 35. As in the first embodiment, the sensor substrate 39 has the passage hole 39a that allows the light emitted by the reflection reading light source 36 to pass through the sensor substrate 39. In this embodiment also, as shown in FIG. 5, holding portions 33c protruding upward are formed on the lower frame 33B at predetermined intervals in the main-scan direction. The holding portions 33c are inserted into the passage hole 39a to hold the reflection reading light guide 37 therebetween, thereby positioning the reflection reading light guide 37 in the passage hole 39a.

As described above, as in the first embodiment, in the image sensor unit 30 according to this embodiment, the substrate 35 on which the reflection reading light source 36 is disposed on the bottom of the lower frame 33B, so that the optical path length from the reflection reading light source 36 to the reading position $O_1$ can be increased. Therefore, the light emitted by each LED serving as the reflection reading light source 36 is diffused when the light reaches the reading position $O_1$ for the bill S, so that the illuminance at the reading position $O_1$ can be made uniform.

Further, the sensor substrate 39 disposed above the substrate 35 on which the reflection reading light source 36 is mounted has the passage hole 39a that allows the light emitted by the reflection reading light source 36 to pass through and reach the reading position $O_1$ for the bill S. Therefore, in the image sensor unit 30, the light receiving element 40 can be disposed at a position that is closer to one end of the frame 33 in the sub-scan direction and is close to a side wall of the frame 33, so that the image information on the bill S can be read immediately after the bill S is conveyed by the conveyor rollers 101A and 101B. Immediately after being conveyed by the conveyor rollers 101A and 101B, the bill S is less likely to be bent in the direction of the optical axis Z or to meander in the main-scan direction and is accurately positioned with respect to the reading position $O_1$. Thus, the reading accuracy of the image sensor unit 30 can be improved.

Although preferred embodiments of the present invention have been described above, the present invention is not limited to these embodiments, and various modifications and alterations can be made without departing from the spirit of the present invention. For example, the first embodiment, the second embodiment and so on can be combined as required.

In the first embodiment and the second embodiment, cases where the reflection reading light guide 16, 37 is inserted into and placed in the passage hole 20*a*, 39*a* of the sensor substrate 20, 39 have been described. However, the present invention is not limited to such cases. It is essential only that the light emitted by the reflection reading light source 15, 36 can pass through the passage hole 20*a*, 39*a*, and therefore, the reflection reading light guide 16, 37 may be disposed above the sensor substrate 20, 39, for example. That is, the light emitted by the reflection reading light source 15, 36 may reach the object to be illuminated after passing through the passage hole 20*a*, 39*a*, being incident on the reflection reading light guide 16, 37 and being emitted therefrom.

Figure 6:
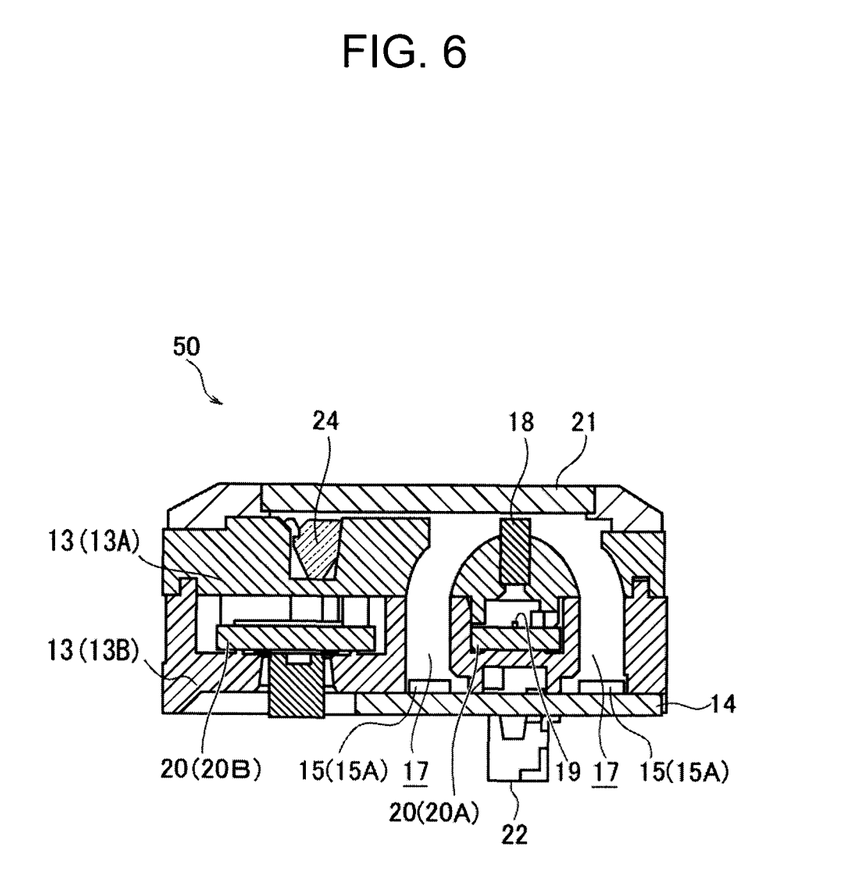
FIG. 6 is a sectional view illustrating a configuration of essential parts of an image sensor unit 50 according to a modification of the first embodiment.

Further, the reflection reading light guide 16, 37 may be omitted as required. FIG. 6 is a sectional view illustrating a configuration of essential parts of an image sensor unit 50 according to a modification of the first embodiment. The image sensor unit 50 is the image sensor unit 10 according to the first embodiment in which the reflection reading light guide 16 is omitted. In this case, the interior of the reflection reading light guide housing portion 17 is used as an optical path, so that the inner surface of the reflection reading light guide housing portion 17 is preferably a reflection surface formed by a continuous curved surface.

Further, in the first embodiment and the second embodiment, the reflection reading light source 15, 36 mounted on the substrate 14, 35 has been described as an array of LEDs arranged at predetermined intervals in the main-scan direction. However, the present invention is not limited to such cases, and only a single light source, such as an LED, may be disposed on the substrate 14, 35, or a plurality of light sources, such as LEDs, spaced apart from each other may be disposed on the substrate 14, 35.

Further, in the first embodiment and the second embodiment, cases where the frame 13, 33 is formed by the separate upper frame 13A, 33A and lower frame 13B, 33B has been described. However, the present invention is not limited to such cases, and the upper frame 13A, 33A and the lower frame 13B, 33B may be integrated, and the integral frame may be used. In this case, the sensor substrate 20, 39, the substrate 14, 35 and other components can be assembled into the frame by inserting them into the frame from the side along the main-scan direction.

Further, in the first embodiment, a case where the lower image sensor unit portion 10A and the upper image sensor unit portion 10B have the same configuration and are disposed symmetrically with respect to the center line Oc shown in FIG. 1 has been described. However, the present invention is not limited to such a case. That is, the lower image sensor unit portion 10A and the upper image sensor unit portion 10B may not have the same configuration, and only one of them may have the transmission reading illumination portion 12.

The image sensor unit according to the present invention is effectively used as an image reading apparatus, such as an image scanner, facsimile, copying machine and a paper sheet identification apparatus that authenticates a recording medium, such as a bill, security and so on.

According to the present invention, the second substrate is disposed closer to the object to be illuminated than the first substrate on which the light source is mounted, and the light guide is disposed by being inserted into the passage hole of the second substrate, the optical path length form the light source to the object to be illuminated can be increased. As a result, the illuminance can be made uniform, so that the illuminance unevenness can be reduced without increasing the number of components.

On the second substrate, the light receiving element is mounted on one side of the passage hole in the sub-scan direction, and the driving circuit for driving the light receiving element is mounted on the other side of the passage hole in the sub-scan direction. Since the light receiving element and the driving circuit can be spaced apart from each other in this way, the influence of the heat generated by the driving circuit on the light receiving element can be reduced.

In addition, in the image reading apparatus that reads image information using reflected light and transmitted light, the transmission reading light source is disposed on the second substrate. Therefore, the transmission reading light source can be disposed close to the object to be illuminated, so that attenuation of the light quantity can be avoided.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An image sensor unit that reads image information from an illuminated object, comprising:
    a light source that illuminates an object to be illuminated;
    a first substrate on which said light source is mounted;
    a light guide that guides light emitted by said light source to said object to be illuminated;
    an imaging element that focuses light from said illuminated object;
    a light receiving element that receives light from said imaging element;
    a second substrate on which said light receiving element is mounted; and
    a frame that houses said first substrate, said light guide, said imaging element and said second substrate,
    wherein said second substrate has a passage hole and is disposed closer to said object to be illuminated than said first substrate, and
    said frame is disposed with said light guide inserted into said passage hole, so that the light from said light source reaches said object to be illuminated through said passage hole.

2. The image sensor unit according to claim 1, wherein on said second substrate, said light receiving element is mounted on one side in a sub-scan direction from said passage hole, and a driving circuit that drives said light receiving element is mounted on the other side in the sub-scan direction from said passage hole.

3. The image sensor unit according to claim 1, wherein said light guide has:
    a first light guide disposed by being inserted into said passage hole; and
    a second light guide disposed at a position on the opposite side of said light receiving element to said first light guide and along a side edge of said second substrate.

4. The image sensor unit according to claim 3, wherein said light source has a first light source that emits light to said first light guide and a second light source that emits light to said second light guide, and said first light source and said second light source are mounted on said first substrate.

5. The image sensor unit according to claim 1, wherein said first substrate has a first connector that is disposed to protrude from said frame, and
said second substrate has a second connector that is disposed by being inserted into said frame.

6. An image reading apparatus provided with an image sensor unit that reads image information from an illuminated object,
wherein said image sensor unit comprises:
a light source that illuminates an object to be illuminated;
a first substrate on which said light source is mounted;
a light guide that guides light emitted by said light source to said object to be illuminated;
an imaging element that focuses light from said illuminated object;
a light receiving element that receives light from said imaging element;
a second substrate on which said light receiving element is mounted; and
a frame that houses said first substrate, said light guide, said imaging element and said second substrate,
said second substrate has a passage hole and is disposed closer to said object to be illuminated than said first substrate,
said frame is disposed with said light guide inserted into said passage hole, so that the light from said light source reaches said object to be illuminated through said passage hole, and
said image sensor unit reads the image information from said illuminated object while said illuminated object and said image sensor unit are moved with respect to each other.

7. An image reading apparatus provided with a first image sensor unit and a second image sensor unit that read image information from an illuminated object, said first image sensor unit and said second image sensor unit being disposed one above the other,
wherein said first image sensor unit comprises:
a reflection reading light source that illuminates an object to be illuminated;
a transmission reading light source that illuminates the object to be illuminated;
a first substrate on which said reflection reading light source is mounted;
a reflection reading light guide that guides light emitted by said reflection reading light source to said object to be illuminated;
a transmission reading light guide that guides light emitted by said transmission reading light source to said object to be illuminated;
an imaging element that focuses light from said illuminated light;
a light receiving element that receives light from said imaging element;
a second substrate on which said transmission reading light source and said light receiving element are mounted; and
a frame that houses said first substrate, said reflection reading light guide, said transmission reading light guide, said imaging element and said second substrate,
said second substrate has a passage hole and is disposed closer to said object to be illuminated than said first substrate,
said frame is disposed with said reflection reading light guide inserted into said passage hole, so that the light from said reflection reading light source reaches said object to be illuminated through said reflection reading light guide in passage hole,
the light from said transmission reading light source reaches said object to be illuminated through said transmission reading light guide,
said second image sensor unit comprises:
an imaging element that focuses light from said illuminated object;
a light receiving element that receives light from said imaging element;
a sensor substrate on which said light receiving element is mounted; and
a frame that houses said imaging element and said sensor substrate, and
said first image sensor unit emits light to one surface of said object to be illuminated and reads the image information using light reflected by said object, and said second image sensor unit reads the image information using light transmitted through the object.

* * * * *